United States Patent
Kim et al.

(10) Patent No.: US 7,783,314 B2
(45) Date of Patent: Aug. 24, 2010

(54) SYSTEM AND METHOD FOR PROVIDING PTT SERVICE ACCORDING TO USER STATE

(75) Inventors: Si-Baek Kim, Suwon-si (KR); Dae-Hyun Lee, Suwon-si (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 721 days.

(21) Appl. No.: 11/633,002

(22) Filed: Dec. 4, 2006

(65) Prior Publication Data

US 2007/0178925 A1    Aug. 2, 2007

(30) Foreign Application Priority Data

Jan. 13, 2006    (KR) .................. 10-2006-0004069

(51) Int. Cl.
*H04B 7/00* (2006.01)
(52) U.S. Cl. ...................... 455/518; 455/466
(58) Field of Classification Search ............... 455/518, 455/519, 412.1, 418
See application file for complete search history.

(56) References Cited

U.S. PATENT DOCUMENTS 6,990,353 B2 * 1/2006 Florkey et al. .............. 455/519

2002/0145986 A1   10/2002   Eteminan
2005/0250476 A1 * 11/2005   Worger et al. ............ 455/412.1
2006/0270429 A1 * 11/2006   Szymanski et al. ........ 455/518

FOREIGN PATENT DOCUMENTS

| DE | 10-2004-005-750 | 8/2005 |
| EP | 1-564-929 | 8/2005 |
| WO | WO 02/089501 | 11/2002 |
| WO | WO 2004/008336 | 1/2004 |

OTHER PUBLICATIONS

European Serach Report corresponding to European Patent Application No. 07000104.5 issued on Mar. 14, 2007.

* cited by examiner

*Primary Examiner*—Tu X Nguyen
(74) *Attorney, Agent, or Firm*—H.C. Park & Associates, PLC

(57) ABSTRACT

In a system and method for providing Push To Talk (PTT) service according to a state of the user, when a PTT terminal user is absent, in conference or busy, the PTT system converts the PTT voice message directed to the PTT terminal to a text message, and displays it on a screen of another terminal or the PTT terminal. As a result, the user can immediately check the PTT message when he/she is in absence or conference state, and is busy without communication interference.

16 Claims, 7 Drawing Sheets

SYSTEM AND METHOD FOR PROVIDING PTT SERVICE ACCORDING TO USER STATE

CLAIM OF PRIORITY

This application makes reference to, incorporates the same herein, and claims all benefits accruing under 35 U.S.C.§119 from an application for SYSTEM AND METHOD FOR PTT SERVICE ACCORDING TO A TERMINAL USER SITUATION earlier filed in the Korean Intellectual Property Office on the 13 Jan. 2006 and there duly assigned Ser. No. 10-2006-0004069.

BACKGROUND OF THE INVENTION

1. Technical Field

The present invention relates to a system and method for providing Push To Talk (PTT) service according to the state of a user.

2. Related Art

As communication technology has developed in recent years and communication networks have become widely used, various services using communication terminals, in addition to traditional telephone service, have been provided. An example of such services is Push To Talk (PTT) service. The PTT service is unidirectional and allows group service, wherein a sender is allowed to transfer communication data, including voice data, to a receiver or a receiver group in one direction.

The PTT service is faster than telephone service since it requires a relatively simpler call establishing process. In addition, the PTT service is realized with a lower cost since it occupies a wire/wireless resource only when communication data is being transmitted. Particularly, these features enable the PTT service to be effectively used in some cases.

For example, when telephone service is used for unidirectional notice and for information delivery requiring no bidirectional communication between a sender and a receiver, time is wasted until a receiver responds and more telephone fee is generated. However, the PTT service can satisfy a user demand in a short time and at less service fee.

However, in the PTT service, since a sender transmits communication data without checking the state of the receiver, a receiver may not receive the PTT data transmitted by the sender. For example, when PTT voice data is received during the receiver's absence, the receiver cannot hear PTT voice. In order to solve this problem, a method of storing PTT voice data and then delivering it to the receiver has been conventionally used.

In the PTT system, when a PTT terminal user is absent, a PTT voice message received at the PTT terminal via a PTT server is stored in the PTT server or the PTT terminal, and a user is then notified that there is stored PTT voice data through a speaker, lamp, or the like of the PTT terminal.

However, when PTT voice data needs to be immediately delivered to the receiver, the above mentioned method, in which the data is delivered to a user later, has no effect.

Furthermore, in the PTT service, since PTT voice data is immediately sent from a sender to a receiver irrespective of the current state of the receiver, a PTT voice message is outputted through the speaker of the PTT terminal, even when the receiver is busy, thus interfering with communication.

SUMMARY OF THE INVENTION

It is an object of the present invention to provide a system and method for providing Push To Talk (PTT) service according to the state of a user, the system and method enabling a received PTT message to be immediately checked, even when a PTT terminal user is absent in the PTT system.

It is another object of the present invention to provide a system and method for providing PTT service according to a state of the user, the system and method enabling the user in a busy state to check PTT data without interfering with communication in the PTT system.

A first aspect of the present invention provides a Push To Talk (PTT) system, comprising: a first terminal for generating and transmitting a signal indicating a current state of a user; a second terminal set to receive data directed to the first terminal; and a PTT server for converting a PTT voice message directed to the first terminal to a text message, and for transmitting the PTT text message to the first terminal or the second terminal when the signal indicating the current state of the user is received from the first terminal.

The second terminal may comprise at least one of a mobile terminal, a PTT terminal, and a terminal having a short message output unit which are used by a user of the first terminal.

The signal indicating the current state of the user may comprise at least one of signals indicating absence, conference and busy states, respectively.

The signal indicating an absence or conference state may be generated when the first terminal receives from the user an absence or conference setting signal through a predetermined setting key.

The signal indicating a busy sate may be generated by the first terminal when a call is established with any terminal.

The signal indicating the current state of the user may comprise a number of the second terminal.

The second terminal number may be a pre-stored terminal number or a terminal number which is inputted from a user when the signal indicating the current state of the user is generated.

The PTT server may transmit the PTT voice message to the first terminal when the signal indicating the current state of the user received from the first terminal is the signal indicating an absence state.

The first terminal may transmit an absence, conference or busy release signal to the PTT server when an absence or conference release setting signal is inputted by the user through a predetermined setting key or when a call established with any terminal is terminated.

A second aspect of the present invention provides a method for providing PTT service according to a state of a terminal user in a PTT system, the method comprising the steps of: generating, by a first terminal, a signal indicating a current state of a user, and transmitting the signal to a PTT server; receiving and storing, by the PTT server, the signal indicating the current state of the user from the first terminal; when the PTT server receives a PTT voice message directed to the first terminal, converting the PTT voice message to a text message; and transmitting, by the PTT server, the PTT text message to the first terminal or to a second terminal set to receive data directed to the first terminal, respectively.

The step of generating, by the first terminal, a signal indicating the current state of the user may comprise the step of generating, by the first terminal, at least one of signals indicating absence, conference and busy states, respectively.

The step of generating, by the first terminal, a signal indicating an absence or conference state may comprise the step of generating the signal indicating an absence state when the first terminal receives an absence or conference setting signal through a predetermined setting key.

The step of generating, by the first terminal, the signal indicating a busy sate may comprise the step of generating the signal indicating a busy state when a call is established with any terminal.

The step of generating, by the first terminal, the signal indicating the current state of the user may comprise the step of generating the signal indicating the current state of the user containing a number of a second terminal, the second terminal being at least one of a mobile terminal, a PTT terminal and a terminal having a short message output unit, which are used by a user of the first terminal.

The step of generating, by the first terminal, the signal indicating the current state of the user may comprise the step of receiving and storing the second terminal number from a user, or generating the signal indicating the current state of the user containing the second terminal number received from the user when the signal indicating the current state of the user is generated.

The method may further comprise the step of transmitting the PTT voice message to the first terminal when the PTT server receives the signal indicating an absence state from the first terminal.

The method may further comprise the step of transmitting an absence, conference or busy release signal to the PTT server when the first terminal receives an absence or conference release setting signal from a user, or when a call established with any terminal is terminated.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, a system and method for providing a Push To Talk (PTT) service based on a state of a user according to the present invention will be described in detail with reference to the accompanying drawings.

Figure 1:
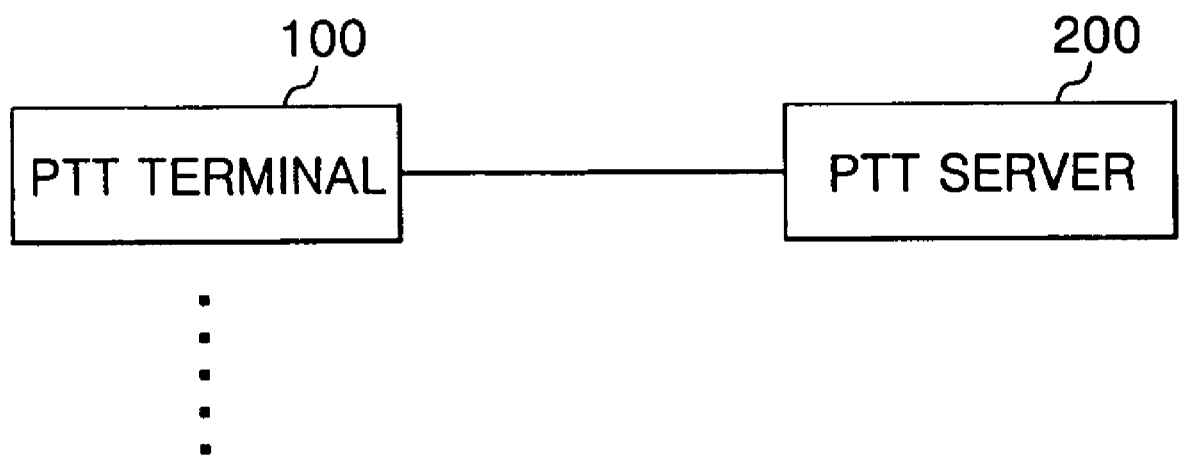
FIG. 1 is a diagram of a Push To Talk (PTT) system according to an exemplary embodiment of the present invention.

FIG. 1 is a diagram of a Push To Talk (PTT) system according to an exemplary embodiment of the present invention.

Referring to FIG. 1, a PTT system includes a PTT terminal 100 and a PTT server 200.

When a user cannot immediately check PTT voice data, e.g., when he/she is absent, in conference or busy, the PTT terminal 100 generates a state information signal to notify the PTT server 200 of the fact.

When the user is absent, he/she is remote from the PTT terminal 100 and is not allowed to check PTT data received at the terminal 100. In this case, the PTT data to be A received at the PTT terminal 100 needs to be received at another terminal near the user so that the user can immediately check the PTT data.

A PTT terminal which cannot be checked by a user is hereinafter referred to as "a first terminal," and another terminal which can be immediately checked by a user and which is set to receive data directed to the first terminal is referred to as "a second terminal".

When a user is in conference or busy, he/she cannot immediately receive PTT voice data. When PTT voice data is received, voice interferes with conference or communication. In this regard, a terminal affected by the incoming PTT voice data is also referred to as a "first terminal." According to the present invention, received PTT voice data can be converted to text data and provided to the first terminal. If the first terminal does not have a display unit, such as a liquid crystal display (LCD), for outputting text messages, the text data can be received and outputted at the second terminal having a display unit.

The current state of a user may be at least one of absence, conference and busy states. Furthermore, a signal indicating the current state of the user includes signals indicating absence, conference and busy states, respectively.

The PTT terminal 100, i.e., the first terminal, generates the "signal indicating an absence state" and the "signal indicating a conference state" when it receives an absence setting signal and a conference setting signal, respectively, from a user through a predetermined setting key. The first terminal generates the "signal indicating a busy state" when a call is established with any terminal.

The signal indicating an absence state contains a second terminal number. The first terminal receives the second terminal number from the user, and stores it in an initial operation, or it may receive the second terminal number from the user each time it receives an absence setting signal. The signals indicating a conference state and a busy state may contain the second terminal number according to user setting. The second terminal is generally a mobile terminal used by the user having the first terminal.

The PTT server 200 can provide PTT service to the PTT terminal 100. Upon receipt of the signal indicating an absence, busy or conference state from the first terminal, the PTT server 200 converts a PTT voice message directed to the first terminal into a text massage. The PTT server 200 transmits the text message to the first terminal or the second terminal.

Meanwhile, when the PTT server 200 receives a signal indicating an absence state from the first terminal, it transmits the PTT text message to the second terminal and the PTT voice data to the first terminal according to user setting.

The operation of the PTT system will now be described in detail.

It is assumed that the PTT terminal 100, i.e., the first terminal, is a wired PTT terminal, and that the second terminal set to receive data directed to the PTT terminal 100 is a mobile terminal.

Figure 2:
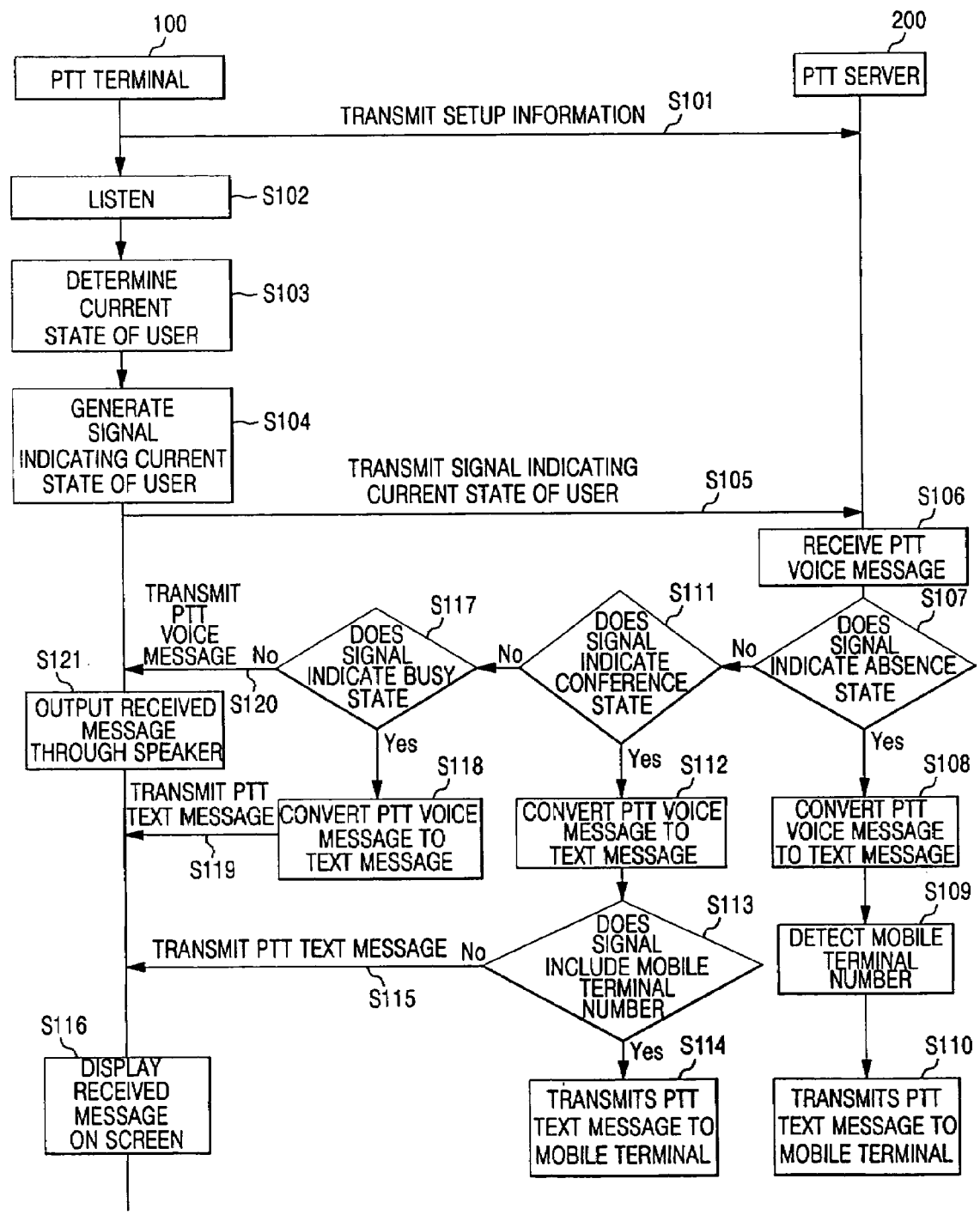
FIG. 2 is a flowchart of the PTT service operation according to a state of a user in a PTT system according to an exemplary embodiment of the present invention.

FIG. 2 is a flowchart of the PTT service operation according to a state of a user in a PTT system according to an exemplary embodiment of the present invention.

Referring to FIG. 2, when the PTT terminal 100 is powered on, it transmits terminal setup information to the PTT server 200 (S101).

The PTT terminal 100 enters a listening mode (S102). In the listening mode, the PTT terminal 100 may determine a current state of a user (S103). When it is determined that the user is in absence, busy or in conference, the PTT terminal 100 generates a signal indicating the current state (S104).

For example, upon receipt of an absence or conference setting signal from the user through a predetermined setting key, the PTT terminal 100 determines that the user is absent or in conference, and the PTT terminal 100 determines that the user is busy when a call is established with any terminal. The PTT terminal 100 then generates a signal indicating an absence, conference or busy state as a signal indicating a current state of the user.

To generate the signal indicating an absence state, the PTT terminal 100 has a mobile terminal number which is received from the user and stored in an initial operation, or which is received when an absence setting is received from the user. Furthermore, to generate the signal indicating a conference state, the PTT terminal 100 has a mobile terminal number which is received from the user and stored in an initial operation, or which is received when a conference setting is received from the user. The PTT terminal 100 transmits the generated signal indicating the current state of the user to the PTT server 200 (S105).

Upon receipt of the signal indicating the current state of the user from the PTT terminal 100, the PTT server 200 stores the received signal. When the PTT server 200 receives a PTT voice message directed to the PTT terminal 100 (S106), it analyzes the stored signal indicating the current state of the user, and when the signal indicates an absence state (S107), it converts the received PTT voice message to a text message (S108). The PTT server 200 detects the mobile terminal number from the stored signal (S109), and transmits the converted PTT text message to the mobile terminal corresponding to the mobile terminal number (S110).

Meanwhile, when the stored signal indicates the conference state (S111), the PTT server 200 converts the received PTT voice message to a text message (S112). The PTT server 200 analyzes the stored signal to determine whether it includes a mobile terminal number (S113). If the stored signal includes the mobile terminal number, the PTT server 200 transmits the PTT text message to a corresponding mobile terminal (S114). If the signal does not include the mobile terminal number, the PTT server 200 transmits the PTT text message to the PTT terminal 100 (S115).

Upon receipt of the PTT text message from the PTT server 200, the PTT terminal 100 or the mobile terminal displays the message on the screen (S116).

When the stored signal indicates a busy state (S117), the PTT server 200 converts the received PTT voice message to a text message (S118) and transmits the PTT text message to the PTT terminal 100 (S119).

Upon receipt of the PTT text message from the PTT server 200, the PTT terminal 100 displays the PTT text message on the screen (S116).

On the other hand, when the stored signal does not indicate any of the absence, conference and busy states, the PTT server 200 transmits, to the PTT terminal 100, the PTT voice message, as it is, which a correspondent desires to transmit to the PTT terminal 100.

In this manner, in the PTT system, the PTT terminal 100 determines the current state of the user and transmits a signal indicating the current state to the PTT server 200, and the PTT server 200 converts a PTT voice message directed to the PTT terminal 100 to a text message based on received information, and transmits the text message to the PTT terminal 100 or to the mobile terminal so that the user can check the PTT message on a terminal screen without communication interference when he/she is busy, and so that the user can immediately check the received PTT message through the mobile terminal, even when the user is absent. Furthermore, the PTT system allows the PTT terminal user to check an important PTT message in a text form, even when the user is in conference and cannot receive the PTT voice message, or when he/she does not desire to receive the PTT voice message.

The configuration and operation of the PTT terminal 100 and the PTT server 200 in the PTT system will now be described in detail.

Figure 3:
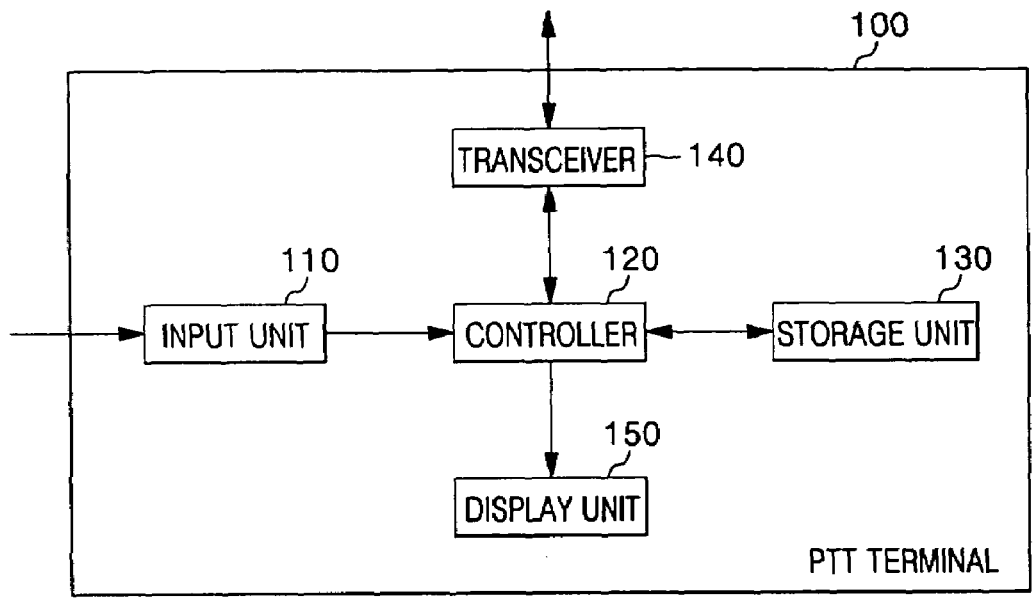
FIG. 3 is a diagram of a PTT terminal according to an exemplary embodiment of the present invention.

FIG. 3 is a diagram of a PTT terminal according to an exemplary embodiment of the present invention.

Referring to FIG. 3, the PTT terminal 100 includes an input unit 110, a controller 120, a storage unit 130, a transceiver 140, and a display unit 150.

In the PTT terminal 100, the input unit 110 includes numeric keys and function setting keys. The input unit 110 may receive a user mobile terminal number, an absence or conference setting signal, and the like from the user.

The controller 120 controls the general function of the PTT terminal 100, and generates signals indicating absence, conference and busy states, respectively.

The storage unit 130 stores a called terminal number, a user mobile terminal number, and the like.

The transceiver 140 transmits and receives a PTT signal, and the display unit 150 displays messages and a PTT message converted into text format, which messages are received from the controller 120.

The operation of the PTT terminal 100 will now be described. The input unit 110 of the PTT terminal 100 receives an absence setting signal from the user through a predetermined setting key, and outputs the signal to the controller 120.

Upon receipt of the absence setting signal from the input unit 110, the controller 120 determines whether there is a mobile terminal number stored in the storage unit 130. If there is a stored mobile terminal number, the controller 120 outputs a message to the display unit 150 in order to query whether the user uses the stored mobile terminal number. For example, the controller 120 may generate a message instructing the display unit 150 to select number 1 when the user uses the stored mobile terminal number and number 2 when he/she does not use it, and outputs the message to the display unit 150.

When receiving the message from the controller 120, the display unit 150 displays the message. The input unit 110 then receives a response signal from the user through a predetermined numeric key or a setting key indicating whether the user uses the stored mobile terminal number, and outputs the response signal to the controller 120.

When the controller 120 receives a signal from the input unit 110 indicating that the user continues to use the pre-stored mobile terminal number, it generates a signal indicating an absence state, the signal containing the mobile terminal number stored in the storage unit 130. When the controller 120 receives a signal from the input unit 110 indicating that the user does not use the stored mobile terminal number, it outputs a message instructing to input the user mobile terminal number to the display unit 150 so that the display unit 150 displays the message. The input unit 110 then receives a mobile terminal number through predetermined numeric keys from the user, and outputs the mobile terminal number to the controller 120.

When the mobile terminal number is received from the input unit 110, the controller 120 generates a signal indicating an absence state, the signal containing the input mobile terminal number.

After generating the signal indicating an absence state, the controller 120 transmits the signal to the PTT server 200 via the transceiver 140.

Meanwhile, when the input unit 110 receives the conference setting signal through a predetermined setting key from the user, it outputs the conference setting signal to the controller 120.

Upon receipt of the conference setting signal from the input unit 110, the controller 120 outputs to the display unit 150 a message instructing to select a terminal to receive a PTT message so that the display unit 150 displays the message. For example, the controller 120 may generate a message instructing to select number 1 for the PTT terminal 100 and number 2 for the mobile terminal, and outputs the message to the display unit 150. When the user selects a PTT terminal through a predetermined numeric key, the input unit 110 outputs a signal indicating the selected PTT terminal to the controller 120.

When the controller 120 receives a signal from the input unit 110 indicating that the selected PTT terminal is a mobile terminal, it determines whether there is a mobile terminal number stored in the storage unit 130. When there is a pre-stored mobile terminal number, the controller 120 outputs a message on the display unit 150 to query whether the user uses the stored mobile terminal number. When the display unit 150 receives the message from the controller 120, it displays the message, and then the input unit 110 outputs a response signal to the controller 120 when it receives the response signal through a predetermined numeric key or a setting key from the user.

Upon receipt of a signal from the input unit 110 indicating that the user continues to use the pre-stored mobile terminal number, the controller 120 generates a signal indicating a conference state and containing the mobile terminal number stored in the storage unit 130. However, upon receipt of a signal from the input unit 110 indicating that the user does not use the stored mobile terminal number, the controller 120 outputs a message instructing to input the user mobile terminal number to the display unit 150 so that the display unit 150 displays the message. The input unit 110 then receives a mobile terminal number through a predetermined numeric key from the user, and outputs it to the controller 120.

When the controller 120 receives the user mobile terminal number from the input unit 110, it generates a signal indicating a conference state and containing the input mobile terminal number.

Meanwhile, when the controller 120 receives a signal from the input unit 110 indicating that the PTT terminal selected by the user is the first terminal, it generates a signal indicating a conference state but including no user mobile terminal number.

After generating the signal indicating a conference state, the controller 120 transmits the generated signal to the PTT server 200 via the transceiver 140.

When a call is established with any terminal via the transceiver 140, the controller 120 generates the signal indicating a busy state, and transmits the generated signal to the PTT server 200 via the transceiver 140.

Figure 4:
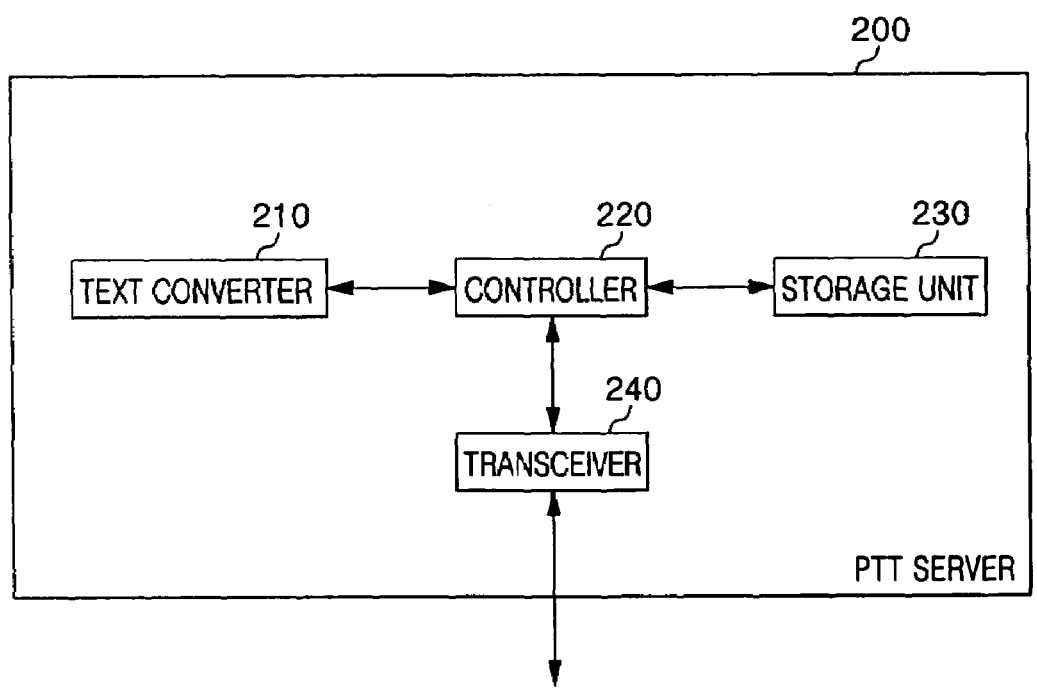
FIG. 4 is a diagram of a PTT server according to an exemplary embodiment of the present invention.

FIG. 4 is a diagram of a PTT server according to an exemplary embodiment of the present invention.

Referring to FIG. 4, the PTT server 200 includes a text converter 210, a controller 220, a storage unit 230, and a transceiver 240.

In the PTT server 200, the text converter 210 converts a PTT voice message to a text message.

The controller 220 controls the general function of the PTT server 200.

The storage unit 230 stores information about connected PTT terminals 100, information about a current state of a user of the PTT terminal 100, and the like.

The transceiver 240 transmits and receives the PTT signal.

The operation of providing PTT service at the PTT server 200 according to a state of the user will now be described.

First, when the transceiver 240 of the PTT server 200 receives a signal from the PTT terminal 100 indicating the current state of a user, it outputs the received signal to the controller 220, and the controller 220 stores the signal in the storage unit 230.

When the controller 220 receives a PTT voice message directed to the PTT terminal 100 via the transceiver 240, it analyzes the signal stored in storage unit 230.

When the signal stored in the storage unit 230 indicates that the user is absent, the controller 220 controls the text converter 210 to convert the received PTT voice message to a text message. The controller 220 analyzes a mobile terminal number contained in the signal indicating an absence state, and transmits the PTT text message to a mobile terminal corresponding to the mobile terminal number via the transceiver 240.

When the signal stored in the storage unit 230 indicates that the user is in conference, the controller 220 controls the text converter 210 to convert the received PTT voice message to a text message. The controller 220 then determines whether the signal indicating a conference state stored in the storage unit 230 contains a mobile terminal number. When it contains a mobile terminal number, the controller 220 transmits the PTT text message to the mobile terminal via the transceiver 240. When it does not contain a mobile terminal number, the controller 220 transmits the PTT text message to the PTT terminal 100 via the transceiver 240.

When the signal stored in the storage unit 230 indicates that the user is busy, the controller 220 controls the text converter 210 to convert the received PTT voice message to a text message, and transmits the PTT text message to the PTT terminal 100 via the transceiver 240.

In this manner, the PTT server 200 converts the PTT voice message directed to the PTT terminal to a text message based on the information indicating the current state of the user as received from the PTT terminal 100, and then transmits the PTT text message to the PTT terminal 100 or the mobile terminal so that the user can immediately check the PTT message, even in absence or in conference, and when he/she is busy without communication interference.

Figure 5:
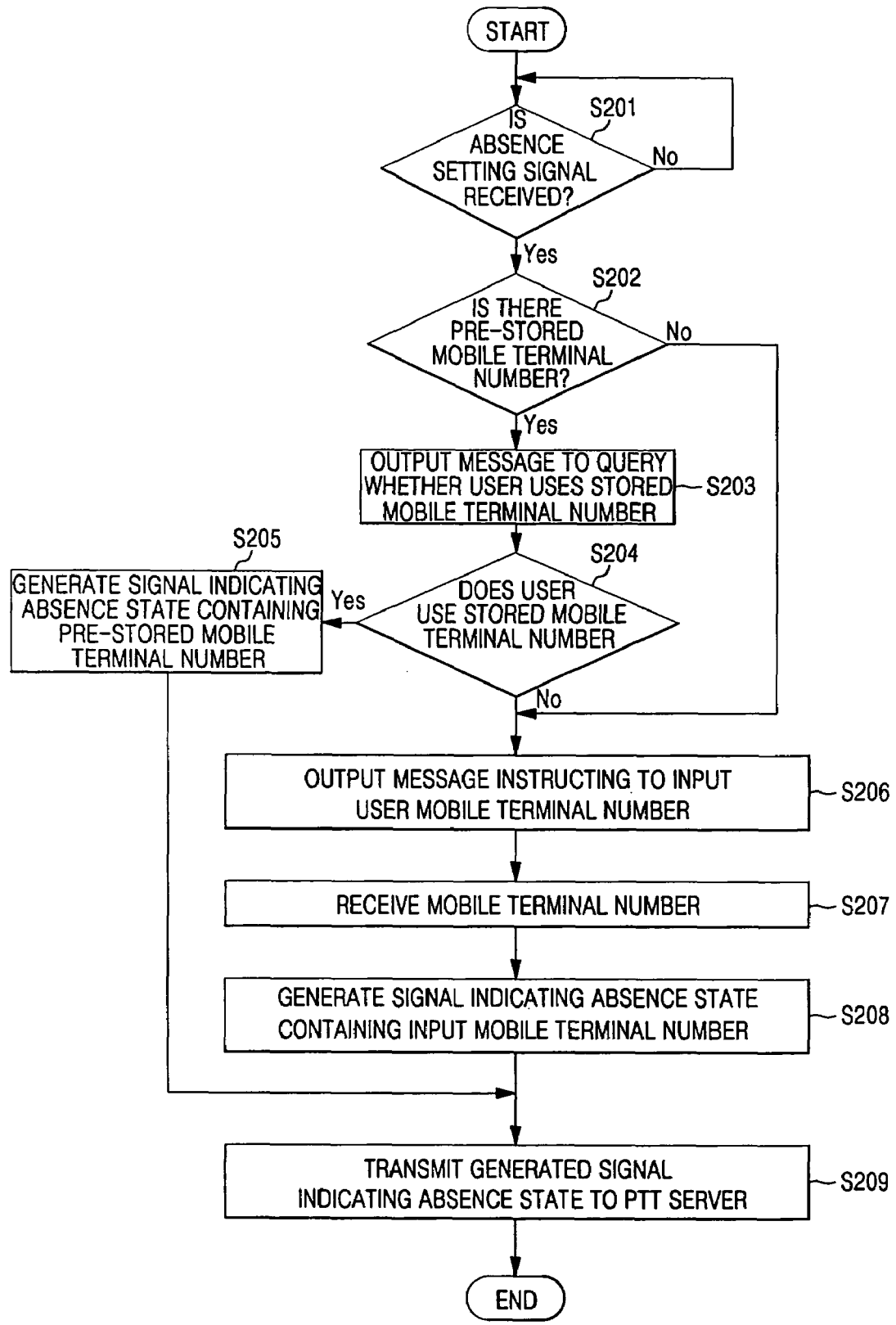
FIG. 5 is a flowchart of the operation of setting an absence state at a PTT terminal according to an exemplary embodiment of the present invention.

FIG. 5 is a flowchart of the operation of setting an absence state at a PTT terminal according to an exemplary embodiment of the present invention.

The PTT terminal 100 determines whether an absence setting signal is received from a user, as shown in FIG. 5 (S201).

When the absence setting signal is received, the PTT terminal 100 determines whether there is a pre-stored mobile terminal number (S202). When there is a pre-stored mobile terminal number, the PTT terminal 100 outputs, on a screen, a message to query whether the user uses the stored mobile terminal number (S203).

Upon receipt of a response signal to the message from the user, the PTT terminal 100 determines whether the received response signal indicates that the user uses the stored mobile terminal number (S204).

When the signal received from the user indicates that the user uses the stored mobile terminal number, the PTT terminal 100 generates a signal indicating an absence state and containing the pre-stored mobile terminal number (S205).

The PTT terminal 100 then transmits the generated signal indicating an absence state to the server 100 (S209).

However, when the signal received from the user indicates that the user does not use the stored mobile terminal number (S204), the PTT terminal 100 outputs a message instructing to input a user mobile terminal number on the screen (S206).

The PTT terminal 100 receives the mobile terminal number from the user (S207), and then generates a signal indicating an absence state and containing the input mobile terminal number (S208).

The PTT terminal 100 then transmits the generated signal indicating an absence state to the PTT server 200 (S209).

Figure 6:
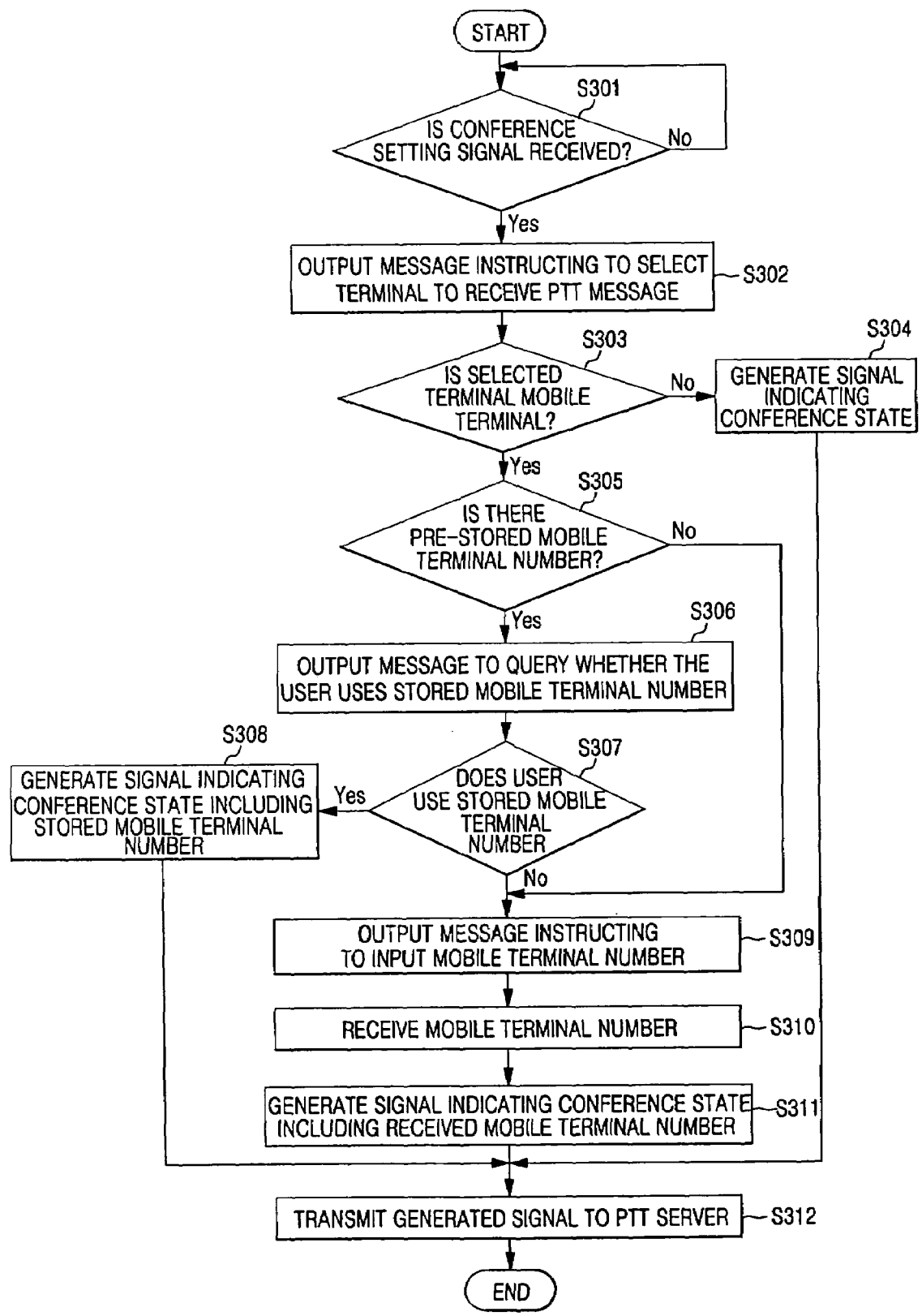
FIG. 6 is a flowchart of the operation of setting a conference state at a PTT terminal according to an exemplary embodiment of the present invention.

FIG. 6 is a flowchart of the operation of setting a conference state at a PTT terminal according to an exemplary embodiment of the present invention.

As shown in FIG. 6, the PTT terminal 100 determines whether a conference setting signal is received from the user (S301).

When the conference setting signal is received from the user, the PTT terminal 100 outputs, on the screen, a message instructing to select a terminal to receive a PTT message (S302).

When a user selects the terminal to receive the PTT message, the PTT terminal 100 determines whether the selected terminal is a mobile terminal of the user (S303). When the selected terminal is the PTT terminal 100, not a mobile terminal, the PTT terminal 100 generates a signal indicating a conference state (S304), and transmits the signal to the PTT server 200 (S312).

When the selected terminal is a mobile terminal (S303), the PTT terminal 100 determines whether there is a pre-stored mobile terminal number (S305). When there is a pre-stored mobile terminal number, the PTT terminal 100 outputs a message on a screen to query whether the user uses the stored mobile terminal number (S306).

Upon receipt of a response signal to the message from the user, the PTT terminal 100 determines whether the received response signal indicates that the user uses the pre-stored mobile terminal number (S307).

When the signal received from the user indicates that the user uses the pre-stored mobile terminal number, the PTT terminal 100 generates a signal indicating a conference state and including the pre-stored mobile terminal number (S308).

The PTT terminal 100 then transmits the generated signal to the server 100 (S312).

However, when the signal received from the user indicates that the user does not use the pre-stored mobile terminal number (S307), the PTT terminal 100 outputs a message instructing to input a user mobile terminal number on the screen (S309).

The PTT terminal 100 then receives the mobile terminal number (S310), and generates a signal indicating a conference state and including the received mobile terminal number (S311).

The PTT terminal 100 transmits the generated signal to the PTT server 200 (S312).

Figure 7:
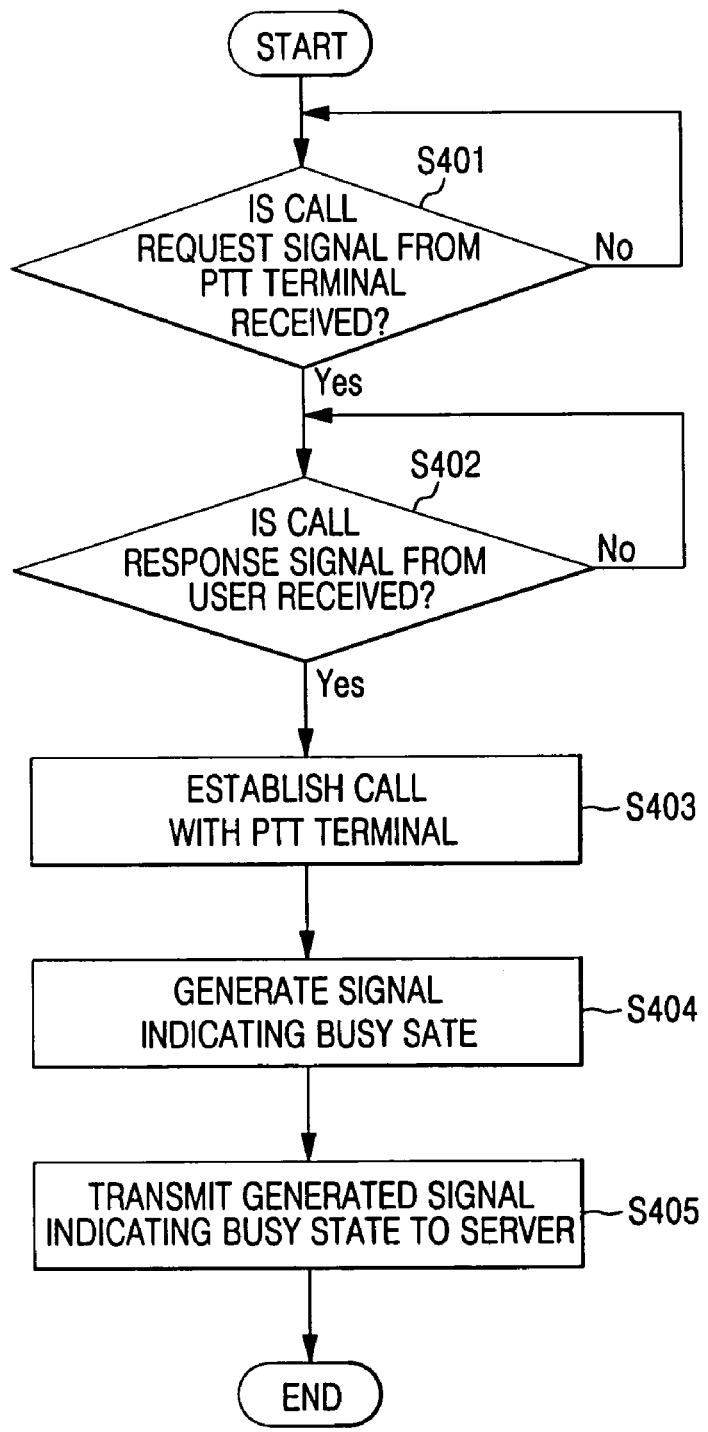
FIG. 7 is a flowchart of the operation of setting a busy state at a PTT terminal according to an exemplary embodiment of the present invention.

FIG. 7 is a flowchart of the operation of setting a busy state at a PTT terminal according to an exemplary embodiment of the present invention.

Referring to FIG. 7, it is determined whether a call request signal is received from the PTT terminal 100 (S401).

If a call request signal is received, the PTT terminal 100 determines whether a call response signal is received from a user (S402). When the call response signal is received, the PTT terminal 100 establishes a call with the PTT terminal 100 (S403).

The PTT terminal 100 then generates a signal indicating a busy sate (S404), and transmits the generated signal to the PTT server 200 (S405).

Figure 8:
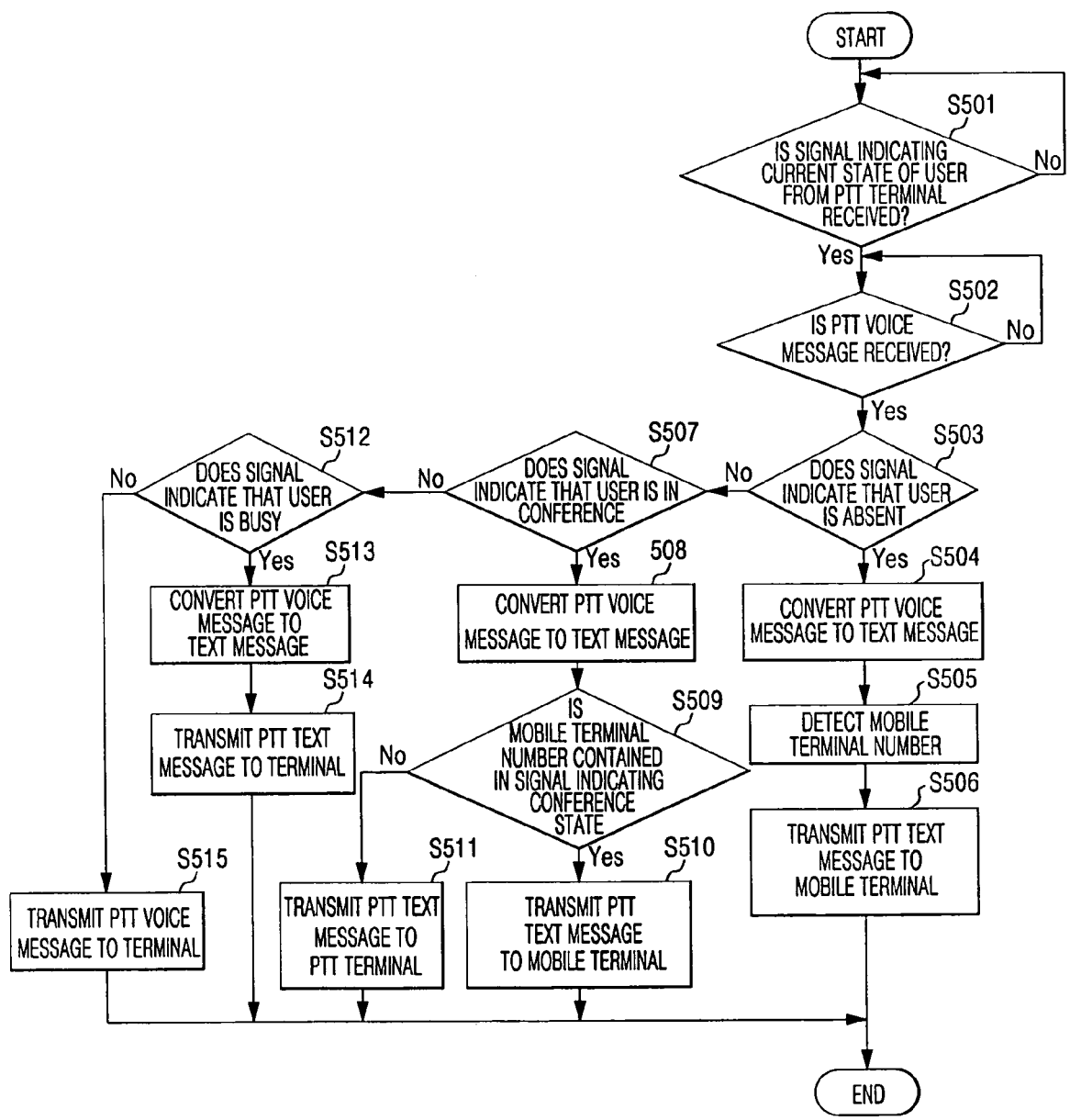
FIG. 8 is a flowchart of a method for providing PTT service according to a state of a user in a PTT server in accordance with an exemplary embodiment of the present invention.

FIG. 8 is a flowchart of a method for providing PTT service in a PTT server according to the state of a user in accordance with an exemplary embodiment of the present invention.

Referring to FIG. 8, the PTT server 200 determines whether a signal indicating the current state of a user is received from the PTT terminal 100 (S501).

When the signal indicating the current state of a user is received from the PTT terminal 100, the PTT server 200 stores the signal, and then determines whether a PTT voice message directed to the PTT terminal 100 is received (S502).

When a PTT voice message directed to the PTT terminal 100 is received, the PTT server 200 determines whether the stored signal indicating the current state indicates that the user is absent (S503). When the stored signal indicates that the user is absent, the PTT server 200 converts the received PTT voice message to a text message (S504).

The PTT server 200 then detects the mobile terminal number from the stored signal indicating the absence state (S505), and transmits the PTT text message to a mobile terminal corresponding to the detected mobile terminal number (S506).

When the stored signal indicates that the user is in conference (S507), the PTT server 200 converts the received PTT voice message to a text message (S508), and then determines whether a mobile terminal number is contained in the stored signal indicating the conference state (S509).

When the mobile terminal number is contained in the stored signal, the PTT server 200 transmits the PTT text message to the mobile terminal (S510).

When the mobile terminal number is not contained in the stored signal, the PTT server 200 transmits the PTT text message to the PTT terminal 100 (S511).

When the stored signal indicates that the user is busy (S512), the PTT server 200 converts the received PTT voice message to a text message (S513), and transmits the PTT text message to the PTT terminal 100 or to the mobile terminal (S514).

When the stored signal does not indicate that the user is absent, in conference or busy, the PTT server 200 transmits the received PTT voice message to the PTT terminal 100 (S515).

In this manner, in the PTT system, the PTT terminal 100 determines the current state of the user, and transmits the signal indicating the current state of the user to the PTT server 200, and the PTT server 200 converts the PTT voice message directed to the PTT terminal 100 to a text message, and transmits the PTT text message to the mobile terminal or the PTT terminal 100.

According to the PTT system of the present invention, when the user of the PTT terminal 100 is currently absent, the PTT voice message directed to the PTT terminal 100 is converted to a text message at the PTT server 200, and is transmitted to the mobile terminal of the user. Furthermore, the PTT voice message directed to the PTT terminal 100 is stored in the PTT terminal 100 or the server 100, and then the PTT voice message is reported to the user through a speaker, a lamp or the like of the PTT terminal 100.

In addition, in the PTT system according to the present invention, after the PTT terminal 100 generates the signal indicating that the user is absent, in conference or busy, and transmits it to the PTT server 200, it generates an absence, conference or busy release signal, and transmits it to the PTT server 200 when the PTT terminal receives an absence or conference release setting signal from the user and a call established with any terminal is terminated.

While the present invention has been described by way of example with respect to the PTT service provided to a wired PTT terminal at the PTT system, it is applicable to a wireless PTT terminal as well.

However, when the PTT terminal in the PTT system is a wireless PTT terminal, it may generate the signal indicating an absence or conference state without receipt of a mobile terminal number from the user. In the PTT system, upon receipt of a signal indicating an absence or conference state, the PTT server may convert the PTT voice message directed to the wireless PTT terminal to a text message, and then transmit it to the wireless PTT terminal.

In the PTT system, however, the signal indicating an absence or conference state may include a number of a wireless PTT terminal other than the wireless PTT terminal, a wired PTT terminal or a terminal having a short message output unit according to needs.

In the system and method for providing PTT service according to the state of a user according to the present invention, when the PTT terminal user is absent, in conference or busy, the PTT system converts the PTT voice message directed to the PTT terminal to a text message, and displays it on a screen of another terminal or the PTT terminal so that the user can immediately check the PTT message without communication interference when he/she is in absence or in conference, or is busy.

While the present invention has been described with reference to exemplary embodiments thereof, it will be understood by those skilled in the art that various changes in form and detail may be made therein without departing from the scope of the present invention as defined by the following claims.

What is claimed is:

1. A Push To Talk (PTT) system, comprising:
a first terminal for generating and transmitting a signal indicating a current state of a user;
a second terminal for receiving data directed to the first terminal when the first terminal is not available; and
a PTT server for receiving a PTT message directed to the first terminal, and for transmitting the PTT message to the second terminal when the signal indicating the current state of the user is received from the first terminal and indicates that the first terminal is not available,
wherein the signal indicating the current state of the user comprises at least one of a signal indicating absence, a signal indicating a conference state, and a signal indicating a busy state, and
wherein the signal indicating the absence state and the signal indicating the conference state are generated when the first terminal receives an absence setting signal and a conference setting signal, respectively, through a predetermined setting key from the user.

2. The system of claim 1, wherein the second terminal comprises at least one of a mobile terminal, a PTT terminal, and a terminal having a short message output, which are used by a user of the first terminal.

3. The system of claim 1, wherein the signal indicating the busy sate is generated by the first terminal when a call is established with any terminal.

4. The system of claim 1, wherein the PTT server transmits the PTT message to the second terminal when the signal indicating the current state of the user received from the first terminal is the signal indicating the absence state.

5. The system of claim 1, wherein the first terminal transmits one of an absence release signal and a conference release signal to the PTT server when one of an absence release setting signal and a conference release setting signal is inputted through a predetermined setting key by the user.

6. The system of claim 1, wherein the first terminal transmits a busy release signal to the PTT server when a call established with any terminal is terminated.

7. A Push To Talk (PTT) system, comprising:
a first terminal for generating and transmitting a signal indicating a current state of a user;
a second terminal for receiving data directed to the first terminal; and
a PTT server for receiving a PTT message directed to the first terminal, and for transmitting the PTT message to one of the first terminal and the second terminal when the signal indicating the current state of the user is received from the first terminal;
wherein the signal indicating the current state of the user comprises a number of the second terminal.

8. The system of claim 7, wherein the number of the second terminal is one of a pre-stored terminal number and a terminal number which is inputted by a user when the signal indicating the current state of the user is generated.

9. A method for providing PTT service according to a state of a terminal user in a PTT system, the method comprising the steps of:
generating, by a first terminal, a signal indicating a current state of a user and transmitting the signal to a PTT server;
receiving and storing, by the PTT server, the signal indicating the current state of the user as received from the first terminal; and
when the PTT server receives a PTT message directed to the first terminal, transmitting, by the PTT server, the PTT message to a second terminal set to receive data directed to the first terminal when the first terminal is not available,
wherein the step of generating, by the first terminal, a signal indicating a current state of a user comprises the step of generating, by the first terminal, at least one of a signal indicating an absence state, a signal indicating a conference state, and a signal indicating a busy state, and
wherein the step of generating, by the first terminal, the signal indicating the conference state comprises generating the signal indicating the conference state when the first terminal receives a conference setting signal through a predetermined setting key.

10. The method of claim 9, wherein the step of generating, by the first terminal, the signal indicating the absence state comprises generating the signal indicating the absence state when the first terminal receives an absence setting signal through a predetermined setting key.

11. The method of claim 9, wherein the step of generating, by the first terminal, the signal indicating the busy state comprises generating the signal indicating the busy state when a call is established with any terminal.

12. The method of claim 9, wherein the step of generating, by the first terminal, the signal indicating the current state of the user comprises generating the signal indicating the current state of the user containing a number of a second terminal, the second terminal being at least one of a mobile terminal, a PTT terminal and a terminal having a short message output unit, which are used by a user of the first terminal.

13. The method of claim 12, wherein the step of generating, by the first terminal, the signal indicating the current state of the user comprises receiving and storing the number of the second terminal from the user.

14. The method of claim 12, wherein the step of generating, by the first terminal, the signal indicating the current state of the user comprises generating the signal indicating the current state of the user containing the second terminal number received from the user when the signal indicating the current state of the user is generated.

15. The method of claim 9, further comprising the step of transmitting the PTT message to the second terminal when the PTT server receives the signal indicating an absence state from the first terminal.

16. The method of claim 9, further comprising the step of transmitting one of an absence release signal and a conference release signal to the PTT server when the first terminal receives one of an absence release setting signal and a conference release setting signal from the user.

* * * * *